United States Patent [19]

McNamara

[11] Patent Number: 5,558,038
[45] Date of Patent: Sep. 24, 1996

[54] BOAT HULL GUNWALE CONSTRUCTION AND PROCESS THEREFOR

[75] Inventor: Don B. McNamara, Menomonee Falls, Wis.

[73] Assignee: Outboard Marine Corporation, Waukegan, Ill.

[21] Appl. No.: 436,586

[22] Filed: May 8, 1995

[51] Int. Cl.⁶ .................................................... B63B 3/00
[52] U.S. Cl. ........................................... 114/355; 114/357
[58] Field of Search ..................................... 114/357, 355; 264/510, 571, 277, 275, 257, 225, 128, 258, DIG. 72

[56] References Cited

U.S. PATENT DOCUMENTS

| | | | |
|---|---|---|---|
| 3,176,055 | 3/1965 | Loos | 114/357 |
| 3,648,310 | 3/1972 | Butler | 114/357 |
| 3,711,581 | 1/1973 | Fowler, Jr. et al. | 264/257 |
| 4,099,280 | 7/1978 | Hoppe et al. | 114/357 |
| 4,142,265 | 3/1979 | Pfleger | 114/357 |
| 4,544,518 | 10/1985 | Kindskog | 264/257 |
| 5,059,377 | 10/1991 | Ashton et al. | 264/257 |
| 5,080,850 | 1/1992 | Holloway | 264/258 |

*Primary Examiner*—Edwin L. Swinehart
*Attorney, Agent, or Firm*—Michael, Best & Friedrich

[57] ABSTRACT

A method of molding a boat hull including a screw strip using the resin transfer molding process, the method comprising the steps of wrapping the screw strip with reinforcement, fabricating a rigid mold having a boat-defining surface including a screw strip receiving recess, applying gel coat to the boat-defining surface in a layer including a gel coated recess, positioning reinforcement having interstices along the gel coat layer and with an upper part of the reinforcement extending into the gel coated recess, locating the reinforcement wrapped screw strip in the gel coated recess to capture the upper part of the reinforcement between the mold and the reinforcement wrapped screw strip, and burying the reinforcement and filling the interstices thereof with a resinous layer to produce the boat hull.

9 Claims, 2 Drawing Sheets

BOAT HULL GUNWALE CONSTRUCTION AND PROCESS THEREFOR

BACKGROUND OF THE INVENTION

The invention relates generally to the resin transfer molding process. More particularly, the invention relates to forming the gunwale area of a boat hull. As is known, it is common practice to provide the gunwale of a boat with a screw strip which serves as a bumper and which also affords the opportunity of attachment thereto of a decorative stripping around the boat gunwale.

Still more particularly, the invention relates to a further development of the subject matter disclosed in co-pending U.S. application Ser. No. 220,110, filed Mar. 30, 1994 and assigned to the assignee of this application now U.S. Pat. No. 5,433,165.

In the past, in the conventional layup or sprayup process, gel coat was applied or sprayed on the mold in such manner as to cover or overlay the mold flange. During the build up of the laminate, extra resin and fiber glass material built up on the mold flange. When the laminate was as thick as desired, plywood screw strips were clamped in the wet resin along the gunwale. Later, after curing of the resin, the material on the flange was used to help remove the boat hull from the mold. Subsequently, this overhanging material was cut off with a diamond saw and the edge finished by grinding with a disk sander.

In the usual practice for forming the gunwale area of a boat hull when using the resin transfer process, the flange area of the mold is masked off and gel coat is then applied. The masking on the mold flange is then removed. After removal of such masking, the mold flange provides a good flat surface for the vacuum plenum to seal against. Dry reinforcement material is then loaded so that the upper edge of the reinforcement material is flush with the flange or top of the mold along the gunwale. The vacuum bag is then put in place, a vacuum is drawn to locate the bag in adjacent relation to the mold, and resin is pumped into the space between the mold and the vacuum bag.

This method suffers from the difficulty that the dry material has a tendency to slide down as the bag is drawn into place. This leads to a thin condition in the gunwale area of the boat hull, and consequently, the hull/deck joint could be weakened. In addition, the thin gunwale is very prone to cracking when removing the boat hull from the mold with the result that reworking in the mold is often required. A screw strip can then be added to the gunwale in the same manner as in the conventional layup process. Attachment of the screw strip in this manner suffers from the absence of something reliable to grab onto or pull on to facilitate removal from the mold of the boat hull because the bond between the screw strip and the mold is insufficient to withstand the shear stress required to pull the boat hull from the mold.

Attention is directed to the following U.S. Pat. Nos.

4,544,518-Issued Oct. 1, 1985

5,059,377-Issued Oct. 22, 1991

5,080,850-Issued Jan. 14, 1992

SUMMARY OF THE INVENTION

The invention provides a method of molding a boat hull including a screw strip using the resin transfer molding process, which method comprises the steps of wrapping the screw strip with reinforcement, fabricating a rigid mold having a boat-defining surface including a screw strip receiving recess, applying gel coat to the boat-defining surface in a layer including a gel coated recess, positioning reinforcement having interstices along the gel coat layer and with an upper part of the reinforcement extending into the gel coated recess, locating the reinforcement wrapped screw strip in the gel coated recess to capture the upper part of the reinforcement between the mold and the reinforcement wrapped screw strip, and burying the reinforcement and filling the interstices thereof with a resinous layer to produce the boat hull.

The invention also provides a method of molding a boat hull including a screw strip using the resin transfer molding process, which method comprises the steps of wrapping the screw strip with reinforcement, fabricating a rigid mold having a boat-defining surface including a screw strip receiving recess and a flange area extending from the recess, masking off a portion of the flange area with a mask, applying gel coat to the boat-defining surface to provide a gel coat layer with a gel coated recess, removing the mask from the flange, positioning in the mold reinforcement with an upper part thereof extending into the gel coated recess, locating the reinforcement wrapped screw strip in the gel coated recess, to capture the upper part of the reinforcement between the gel coat layer and the reinforcement wrapped screw strip, sealingly attaching a vacuum bag to the flange area so as to define between the vacuum bag and the gel coat layer a space, applying vacuum to the space between the vacuum bag and the mold, supplying resin into the space between the vacuum bag and the mold during the application of vacuum, curing the resin to produce said boat hull, and removing the boat hull from the mold by engaging the area of the screw strip to apply boat hull withdrawing force to the boat hull.

The invention also provides a boat hull fabricated by the resin transfer process and comprising a reinforced plastic hull member having an upper periphery with a screw strip buried therein.

The invention also provides a boat hull comprising a reinforced plastic hull member including an outer gel coat layer having an upper periphery, and a screw strip recess at said upper periphery, a layer of reinforcing material having therein interstices and extending along said gel coat layer and including an upper portion extending into said screw strip recess, a screw strip extending in said recess and engaging said upper portion of said reinforcing layer to capture said upper portion between said screw strip and said gel coat layer, and an inner resinous layer which buries said screw strip and said layer of reinforcing material and fills the interstices thereof.

Other features and advantages of the invention will become apparent to those skilled in the art upon review of the following detailed description, claims and drawings.

Figure 1:
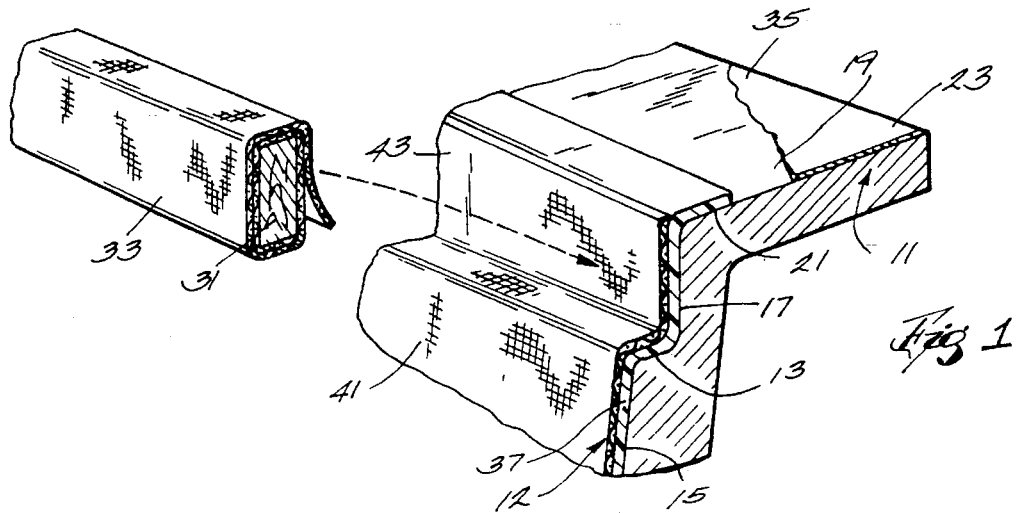
FIG. 1 is a fragmentary view of a partially constructed boat hull which embodies various of the features of the invention and which is constructed in accordance with the method of the invention.
Figure 2:
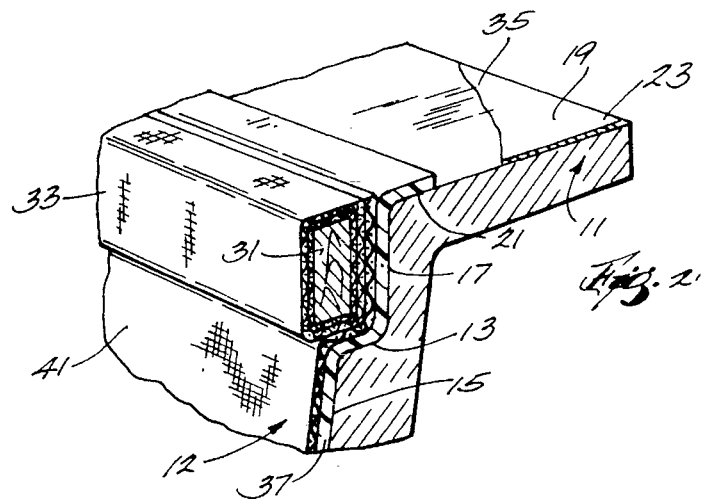
FIG. 2 is a view which is similar to FIG. 1 and which illustrates another stage in the boat building process of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Illustrated in FIG. 1 of the drawings is a rigid female mold 11 which can be constructed in any suitable fashion and which is employed to produce a molded boat hull or hull member 12 by the resin transfer process. The mold 11 comprises an inner surface 13 including a boat hull defining portion 15, and a screw strip recessed portion 17 which extends from the upper outer periphery of the boat hull defining portion 15. The mold 11 also includes a flange or flange area or surface portion 19 which extends outwardly from the top of the screw strip recessed portion 17 and which includes an inner part 21 adjacent the screw strip recessed portion 17 and an outer part 23 extending outwardly from the inner part 21. The upper periphery of the inner surface 13 of the female mold 11 constitutes a gunwale area.

Also illustrated in FIG. 1 is a screw strip 31 which is preferably fabricated from wood or other suitable material having suitable cross-sectional dimensions.

In accordance with the process of the invention, the screw strip 31 is prepared by being cut to length and loaded or pre-wrapped with dry reinforcement material 33, such as fiber glass which, as is known, defines a plurality of interstices. More specifically, the screw strip 31 is preferably completely wrapped in at least one layer of dry reinforcement material 33. If desired, the reinforcing material 33 can be stapled or otherwise fastened to the screw strip 31.

Also in accordance with the process of the invention, and separately from preparation of the screw strip 31, a release agent is applied to the inner surface 13 of the female mold and to the inner part 21 of the flange 19, and a mask 35 is applied to the outer part 23 of the flange area or surface portion 19. Thereafter, a coat or layer 37 of gel coat is applied to the boat hull defining portion 15 and the recessed portion 17 of the inner surface 13 of the female mold 11 and to the adjacent inner part 21 of the flange area or surface portion 19. The gel coat layer 37 includes, in the area of the screw strip recess portion 17, a gel coated recess. After application of the gel coat layer 37, the mask 35 can be removed.

Thereafter a layer 41 of dry reinforcing material 41, such as fiber glass which defines a plurality of interstices, is laid upon the gel coat layer 37 with a portion 43 of such dry reinforcing material extending into the screw strip recessed portion 17. Alternatively, if desired, an unwrapped screw strip can be placed in the gel coated recessed portion 17, wrapped with extra material of the reinforcement portion 43, and stapled as already described.

Thereafter, the screw strip 31, prepared as before described, is placed in the gel coated screw strip recessed portion 17 so as to hold or anchor the portion 43 of the layer of dry reinforcing material which was laid over the gel coat layer 37 on the boat hull define portion 15 of the inner surface 13 of the female mold 11. As a consequence, the layer 41 of reinforcing material will not slide down and away from the upper periphery or gunwale area of the inner surface 13 of the female mold 11. In this regard, friction between the screw strip 31 and the upper portion 43 of the layer 41 of dry reinforcing material, or the fasteners holding the layer(s) of dry reinforcement material 33 on the screw strip 31 will prevent the dry reinforcing material layer 41 from being pulled out of position when the screw strip 31 is captured by the application of the vacuum bag and resin still to be described. Also as a consequence, the layer 41 of reinforcing material will not rest on the inner part 21 of the flange 19 and will not otherwise result in a reinforced layer which must be trimmed off using a diamond saw or other suitable tool after the application of resin and demolding of the part still to be described.

Figure 3:
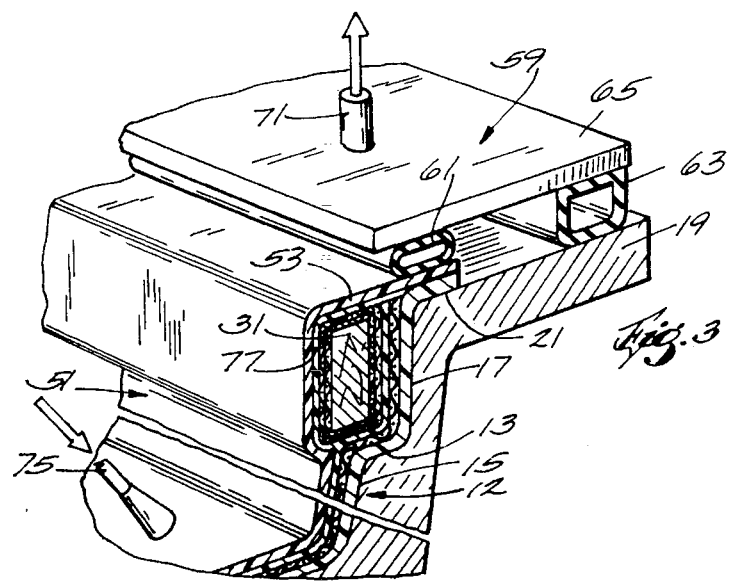
FIG. 3 is a view which is similar to FIG. 1 and which illustrates another further stage in the boat building process of the invention.

Thereafter, as indicated in FIG. 3, a vacuum bag 51 which is preferably fabricated from silicone and suitably shaped, and which has an outer peripheral portion 53, is placed in the female mold 11 with the peripheral portion 53 located on the inner part 21 of the flange portion 19 of the inner surface 13 of the female mold 11.

Thereafter, a seal 59 is provided between the peripheral portion 53 of the vacuum bag 51 and the flange portion 19 of the female mold 11. Any suitable seal known in the art can be employed. In the disclosed construction, a first endless sealing member or seal 61 extends in engagement with and around the outer peripheral portion 53 of the vacuum bag 51, and a second endless sealing member or seal 63 extends, in outwardly spaced relation to the first sealing member 61, in engagement with and around the outer part 23 of the flange portion 19 of the female mold 11. A plate 65 is then placed over the sealing members 61 and 63 and pressure is applied so as to insure that the vacuum bag 51 is tightly sealed to the inner part 21 of the flange area or portion 19. Preferably, the seals or sealing members 61 and 63 are pre-bonded to the plate 65.

Thereafter, vacuum is applied through a fitting 71 to the space between the female mold 11 and the vacuum bag 51 to draw the vacuum bag 51 into the female mold 11 and into closely adjacent relation to the inner surface 13. After the vacuum bag 51 is located in closely adjacent relation to the layer 41 of reinforcing material and, while the vacuum is maintained, resin is pumped through a fitting 75 into the space between the gel coat layer 37 and the vacuum bag 51, to provide a layer 77 of resin filling the space between the vacuum bag and the gel coat layer 37 so as thereby to bury the layer 41 of reinforcing material and to fill the interstices of the reinforcing material.

Figure 4:
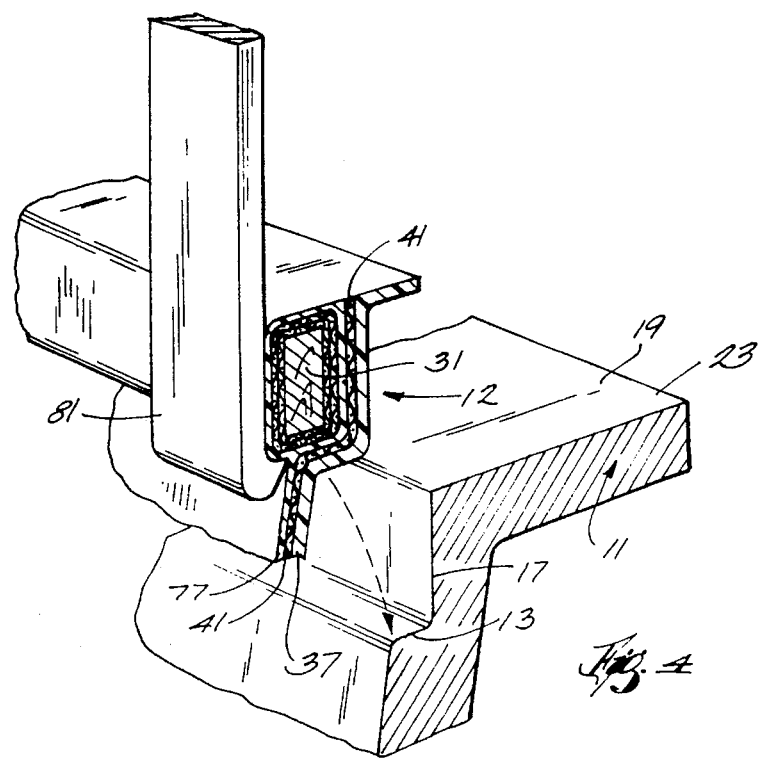
FIG. 4 is a view which is similar to FIG. 1 and which illustrates another further stage in the boat building process of the invention.

Thereafter, and subsequent to curing of the resin to produce the molded boat hull 12, the seal 59 is broken and removed, the vacuum bag 51 is withdrawn from the boat hull 12, and the molded boat hull or member 12 is removed from the female mold 11 to enable reuse of the female mold 11 and the vacuum bag 51 in another cycle. In the removal process, and as shown in FIG. 4, a hook-like member 81 can be engaged with the under side portion of the boat hull or member 12 in the area of the screw strip 31 to apply force to lift the boat hull or hull member 12 from the mold 11.

Figure 5:
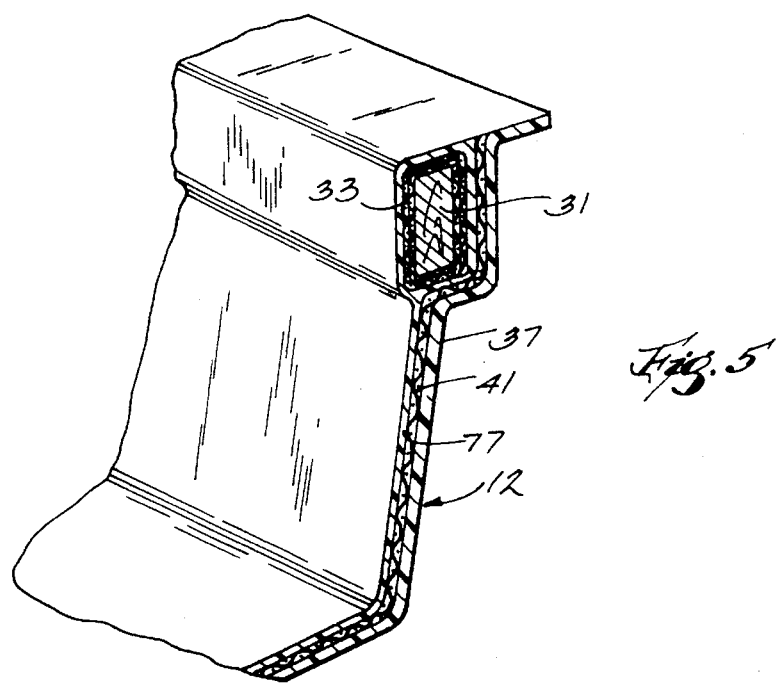
FIG. 5 is a view which is similar to FIG. 1 and which illustrates a completed boat hull which has been constructed in accordance with the method of the invention.

As a consequence of the process just described, there is provided, as shown in FIG. 5, a reinforced plastic boat hull or hull member 12 having an upper periphery with a screw strip 31 buried therein, i. e., captured within the cured resin. More particularly, there is provided a reinforced plastic boat hull or hull member 12 including an outer gel coat layer 37 having an upper periphery with a gel coated screw strip recess therein. The boat hull or hull member 12 also includes a layer 41 of reinforcing material having therein interstices and extending along the gel coat layer 37 and including an upper portion 43 extending into the gel coated screw strip recess. In addition, the boat hull or hull member 12 includes a screw strip 31 extending in the gel coated recess and engaging the upper portion 43 of the reinforcing layer 41 to capture the upper portion 43 between the screw strip 31 and the gel coat layer 37, and an inner layer 77 of resin which buries the screw strip 31 and the layer 41 of reinforcing material and fills the interstices thereof.

Also as a consequence of the process just described, the screw strip 31 is completely enclosed or captured or buried in the molded boat hull or hull member 12 and becomes an integral part of the molded boat hull or hull member 12. Rotting of the prior screw strips, as commonly occurred in the past, is thereby substantially eliminated. In addition, because the screw strip 31 is now an integral part of the molded boat hull 12, the screw strip 31 can be used to hook under or pull on when removing or demolding the molded boat hull 12 from the female mold 11. In further addition, the previously occurring problem of slippage of the dry reinforcing material away from the gunwale area and undesirable collection thereof in areas toward the bottom of the mold is avoided. Trimming of the gunwale is also reduced or substantially eliminated by use of the disclosed process.

Another advantage of the invention is the absence of material on the outer part 23 of the flange 19 and the consequent elimination of the prior need to employ a diamond saw or other suitable tool to remove or trim such material.

While the invention disclosed herein has particular applicability to boat hulls, the invention can also be used in connection with the manufacture of a wide variety of other articles.

Various of the features of the invention are set forth in the following claims.

I claim:

1. A resin transfer molding method for molding a boat hull including a screw strip, said method comprising the steps of wrapping the screw strip with reinforcement, fabricating a rigid mold having a boat-defining surface including a screw strip receiving recess, applying gel coat to the boat-defining surface in a layer including a gel coated recess, positioning reinforcement having interstices along the gel coat layer and with an upper part of the reinforcement extending into the gel coated recess, locating the reinforcement wrapped screw strip in the gel coated recess to capture the upper part of the reinforcement between the mold and the reinforcement wrapped screw strip, and burying the reinforcement and filling the interstices thereof with a resinous layer to produce said boat hull.

2. A method in accordance with claim 1 wherein said burying and filling step includes sealingly attaching a vacuum bag to the mold so as to define between the vacuum bag and the gel coat layer a boat hull-defining space, applying vacuum to the boat hull defining space between the vacuum bag and the mold, and supplying resin into the boat hull-defining space between the vacuum bag and the mold during the application of vacuum to bury the reinforcement and fill the interstices thereof and to produce said boat hull.

3. A method in accordance with claim 1 and further including the additional step of removing the boat hull from the mold by engaging the area of the screw strip to apply boat hull withdrawing force to the boat hull.

4. A resin transfer molding method for molding a boat hull including a screw strip, said method comprising the steps of wrapping the screw strip with reinforcement, fabricating a rigid mold having a boat-defining surface including a screw strip receiving recess and a flange area extending from the recess, masking off a portion of the flange area with a mask, applying gel coat to the boat-defining surface to provide a gel coat layer with a gel coated recess, removing the mask from the flange, positioning in the mold reinforcement with an upper part thereof extending into the gel coated recess, locating the reinforcement wrapped screw strip in the gel coated recess, to capture the upper part of the reinforcement between the gel coat layer and the reinforcement wrapped screw strip, sealingly attaching a vacuum bag to the flange area so as to define between the vacuum bag and the gel coat layer a space, applying vacuum to the space between the vacuum bag and the mold, supplying resin into the space between the vacuum bag and the mold during the application of vacuum, curing the resin to produce said boat hull, and removing the boat hull from the mold by engaging the area of the screw strip to apply boat hull withdrawing force to the boat hull.

5. A boat hull comprising a reinforced plastic hull member including an outer gel coat layer having an upper periphery, and a screw strip recess at said upper periphery, a layer of reinforcing material having therein interstices and extending along said gel coat layer and including an upper portion extending into said screw strip recess, a screw strip extending in said recess and engaging said upper portion of said reinforcing layer to capture said upper portion between said screw strip and said gel coat layer, and an inner resinous layer which buries said screw strip and said layer of reinforcing material and fills the interstices thereof.

6. A boat hull comprising a reinforced plastic hull member including an outer gel coat layer having a screw strip recess, a layer of reinforcing material having therein interstices and extending along said gel coat layer and including a portion extending into said screw strip recess, a screw strip extending in said recess and engaging said portion of said reinforcing layer to capture said portion between said screw strip and said gel coat layer, and a resinous layer which buries said screw strip and said layer of reinforcing material and fills the interstices thereof.

7. A boat hull comprising a reinforced plastic hull member including an outer gel coat layer having a screw strip recess, reinforcing material having therein interstices and extending along said gel coat layer in said screw strip recess, a screw strip extending in said recess and engaging said reinforcing material to capture said reinforcing material between said screw strip and said gel coat layer, and a resinous layer which buries said screw strip and said reinforcing material and fills the interstices thereof.

8. A boat hull in accordance with claim 7 wherein said screw strip includes a generally vertically extending side, and wherein said hull member includes a lower portion located below said screw strip and having reinforcing material extending upwardly therealong into said screw strip recess and into adjacent relation to said side of said screw strip.

9. A boat hull in accordance with claim 7 wherein said gel coat layer has an outer surface, and a lower portion located below said screw strip, and wherein said reinforcing material extends downwardly along said lower portion from said screw strip recess.

* * * * *